United States Patent
Micu

(10) Patent No.: US 8,264,096 B2
(45) Date of Patent: Sep. 11, 2012

(54) DRIVE SYSTEM FOR USE WITH FLOWING FLUIDS HAVING GEARS TO SUPPORT COUNTER-ROTATIVE TURBINES

(76) Inventor: Tarfin Micu, New Braunfels, TX (US)

( * ) Notice: Subject to any disclaimer, the term of this patent is extended or adjusted under 35 U.S.C. 154(b) by 492 days.

(21) Appl. No.: 12/398,410

(22) Filed: Mar. 5, 2009

(65) Prior Publication Data

US 2010/0225118 A1    Sep. 9, 2010

(51) Int. Cl.
*F03B 13/00*    (2006.01)
*F03B 13/10*    (2006.01)
*F03B 13/12*    (2006.01)
*H02P 9/04*    (2006.01)

(52) U.S. Cl. ................ 290/55; 290/44; 290/43; 290/53; 290/54

(58) Field of Classification Search .................... 290/43, 290/44, 53, 54, 55; *H02P 9/04; F03B 13/00, F03B 13/10, 13/12*
See application file for complete search history.

(56) References Cited

U.S. PATENT DOCUMENTS

| | | | | |
|---|---|---|---|---|
| 2,153,523 A | * | 4/1939 | Edmonds et al. | 290/55 |
| 2,563,279 A | * | 8/1951 | Rushing | 415/4.3 |
| 3,637,995 A | * | 1/1972 | Segawa | 377/82 |
| 4,039,848 A | * | 8/1977 | Winderl | 290/55 |
| 4,217,501 A | * | 8/1980 | Allison | 290/55 |
| 4,717,831 A | * | 1/1988 | Kikuchi | 290/53 |
| 6,943,472 B2 | * | 9/2005 | Buss et al. | 310/98 |
| 6,949,842 B2 | * | 9/2005 | Earley | 290/55 |
| 7,384,239 B2 | * | 6/2008 | Wacinski | 416/128 |
| 2004/0012282 A1 | * | 1/2004 | Haga et al. | 310/75 R |
| 2006/0093482 A1 | * | 5/2006 | Wacinski | 416/128 |
| 2007/0116563 A1 | * | 5/2007 | Ahmad | 415/208.1 |
| 2010/0066095 A1 | * | 3/2010 | Meller | 290/55 |
| 2010/0090468 A1 | * | 4/2010 | Hong | 290/55 |
| 2010/0259050 A1 | * | 10/2010 | Meller | 290/55 |

* cited by examiner

*Primary Examiner* — Quyen Leung
*Assistant Examiner* — Terrance Kenerly
(74) *Attorney, Agent, or Firm* — Bryan L. White

(57) ABSTRACT

The present invention includes a drive system for use in a flowing fluid, the drive system preferably having a first turbine connected to a shaft, a first gear connected to the shaft, a second turbine rotatably mounted on a pipe, a second gear rotatably mounted on the pipe and connected to the second turbine, and two or more satellite gears in fixed locations relative to the pipe and rotatably engaged, directly or indirectly, with the first gear and the second gear. The drive system may be used, for example, in a wind generator to generate electrical energy.

32 Claims, 4 Drawing Sheets

DRIVE SYSTEM FOR USE WITH FLOWING FLUIDS HAVING GEARS TO SUPPORT COUNTER-ROTATIVE TURBINES

BACKGROUND OF INVENTION

1. Field of the Invention

The present invention relates generally to extracting energy from a flowing fluid, and particularly to transferring the kinetic energy of a flowing fluid to a rotatable shaft.

2. Background Art

Devices such as windmills and wind generators have been used for many years to extract energy from the wind and use it to do work. For example, windmills have traditionally been used to pump water or turn a millstone. Wind generators are used to convert the mechanical (i.e., kinetic) energy of the wind to electrical energy. Both windmills and wind generators get their energy from wind blowing onto rotating blades that cause a shaft to rotate. In the applications described above, the rotating shaft is coupled to a mechanical device or an electrical generator.

The efficiency of prior art devices that use the wind's kinetic energy to do work is not very high. For example, in many configurations much of the wind flows past the blades without hitting them. Thus, a great deal of energy remains in the wind. In other configurations, the air flow is effectively blocked and the wind energy goes into the support structure instead of the drive mechanism. While many drive systems have been tried, each of the prior art systems has a low efficiency when it comes to extracting the wind's energy.

SUMMARY

The present invention preferably includes a drive system having a first turbine connected to a shaft, a first gear connected to the shaft, a second turbine rotatably mounted on a pipe, a second gear rotatably mounted on the pipe and connected to the second turbine, and two or more satellite gears in fixed locations relative to the pipe and rotatably engaged, directly or indirectly, with the first gear and the second gear. The drive system may be used, for example, in a wind generator.

Other aspects and advantages of the invention will become apparent from the following description and the attached claims.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency.

Figure 1:
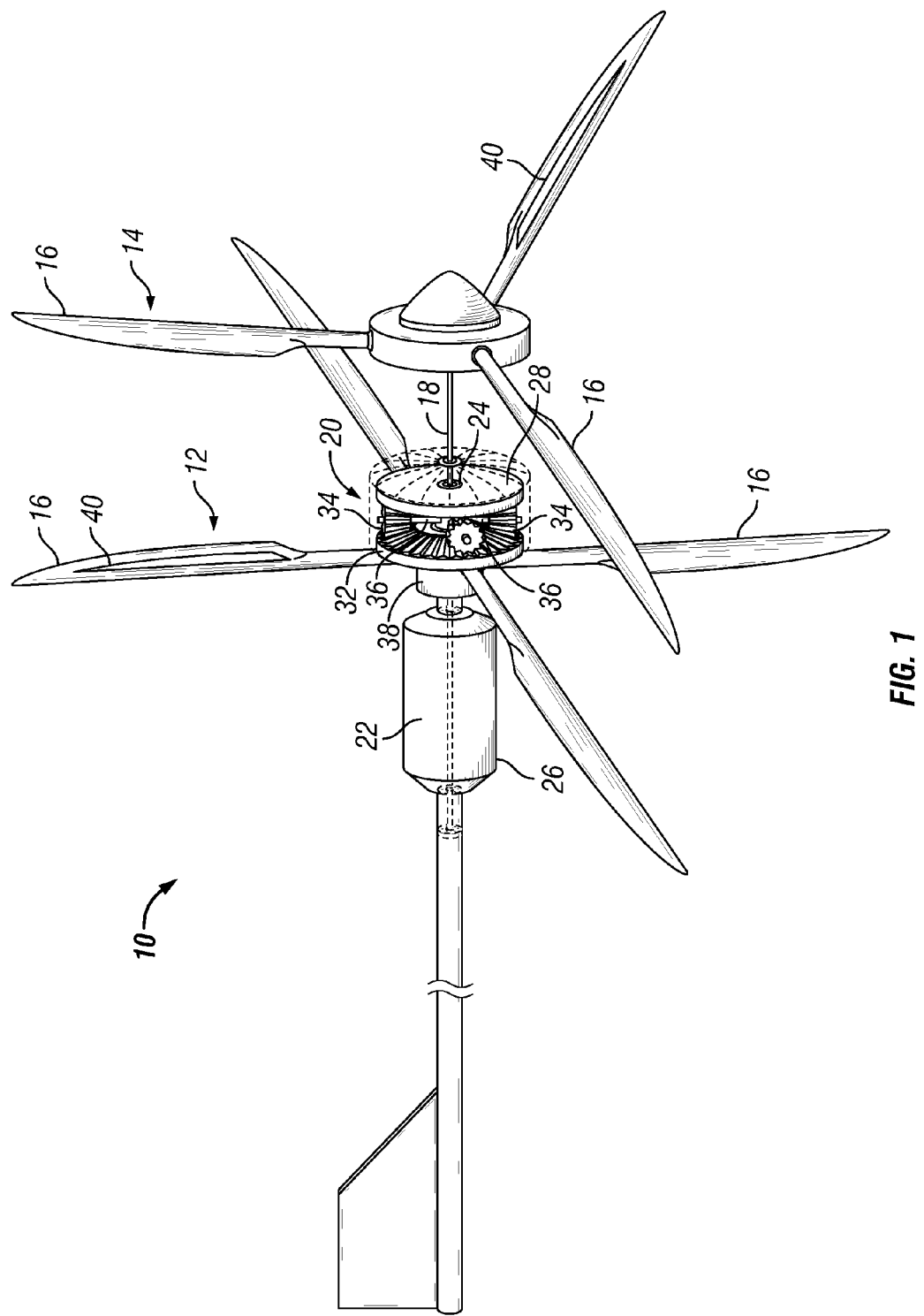
FIG. 1 is a schematic drawing of a wind generator that includes one embodiment of a drive system constructed in accordance with the present invention.

FIG. 1 shows a wind generator 10 with a first turbine 12 and a second turbine 14. First turbine 12 has four blades 16 in the embodiment shown, though more or fewer blades could be used. Similarly, second turbine 14 has three blades 16 in the embodiment shown, though more or fewer blades could be used. Second turbine 14 is connected to a shaft 18 that extends through a gearbox 20 and into an electrical generator 22. Shaft 18 serves to rotate the rotor of generator 22, as is well known in the art. Shaft 18 is preferably aligned with an axis of symmetry of second turbine 14 so as to be statically and dynamically balanced when rotated.

Figure 3A:
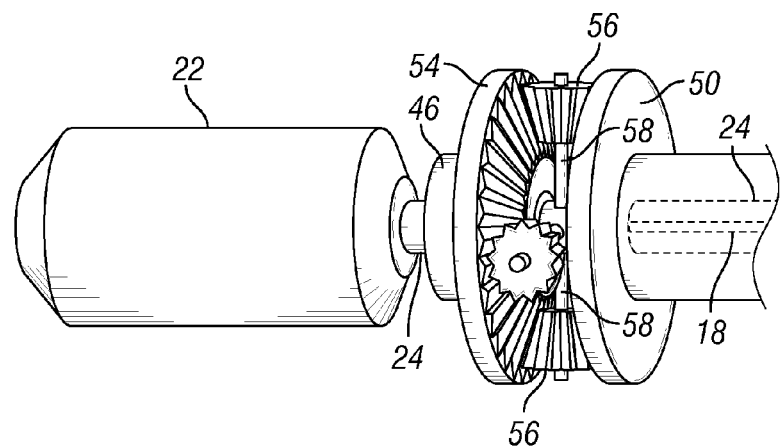
FIGS. 3A and 3B are schematic detailed views of some of the gearing used in accordance with the present invention.
Figure 3B:
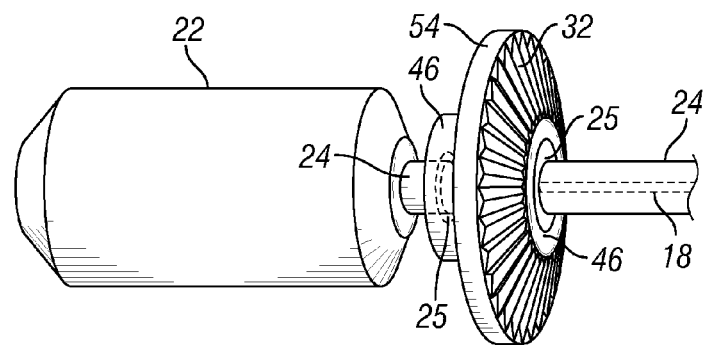
Figure 4:
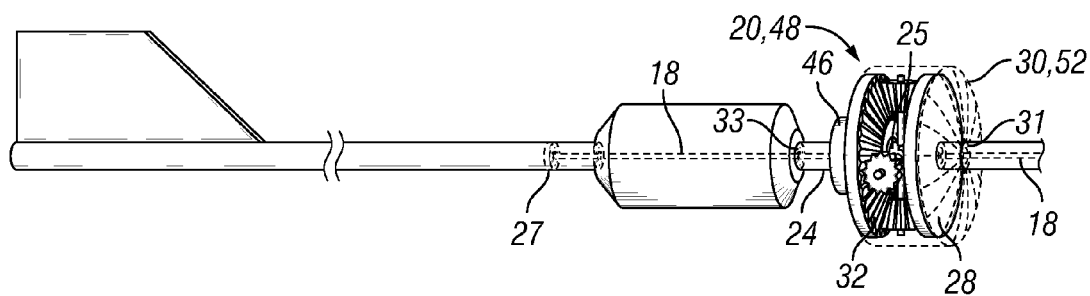
FIG. 4 is a schematic detailed view of a gearbox showing a gearbox housing and some of the gearing used in accordance with the present invention.

Wind generator 10 also has a pipe 24 disposed between first turbine 12 and electrical generator 22. Pipe 24 may be an integral extension of a generator housing 26 or it may be a separate component mounted to generator housing 26. Pipe 24 has a hollow interior so as to allow shaft 18 to pass through the hollow interior region. Pipe 24 is preferably coaxially aligned with shaft 18 and shaft 18 may be mounted in bearings 25 (see FIGS. 3A, 3B, and 4) disposed in the annular region between shaft 18 and pipe 24. Second turbine 14 is cantilevered from shaft 18 in the embodiment shown, though other mounting configurations could be used.

Gearbox 20 is mounted on pipe 24 between first turbine 12 and second turbine 14. A first ring gear 28 is disposed in gearbox 20 and is attached to shaft 18 adjacent to a forward end of pipe 24. FIG. 1 shows a partially exploded or exaggerated view in which second turbine 14 is translated forward of its normal operating position. That is for illustration only. In addition, gearbox 20 has a gearbox housing 30 (see FIG. 4) that is only partially shown so that the interior of gearbox 20 can be seen. First ring gear 28 is proximate to and engages other gears within gearbox 20, as described below. Thus, shaft 18, first ring gear 28, and second turbine 14 all rotate together. A front seal 31 may be used to seal the annular opening between shaft 18 and gearbox housing 30. Similarly, a rear seal 33 can be used to seal the annular space between shaft 18 and a rearward end of pipe 24, near where shaft 18 enters the main portion of generator housing 26. A second ring gear 32 is disposed in gearbox 20 and is rotatably mounted on pipe 24 using, for example, bearings 25. Second ring gear 32 is attached on its rearward side to first turbine 12, as described in more detail below.

Two or more satellite gears 34 are disposed between and rotatably engage first ring gear 28 and second ring gear 32. Preferably two pairs of diametrically opposed satellite gears 34 are used (i.e., four gears spaced ninety degrees apart), but more or fewer satellite gears 34 may be used. First ring gear 28, second ring gear 32, and satellite gears 34 are all preferably beveled in a complementary fashion, as is known in the art, so as to allow satellite gears 34 to simultaneously engage and rotate relative to first ring gear 28 and second ring gear 32. Each satellite gear 34 is rotatably mounted on one end of an associated rod 36. The other end of that associated rod 36 is attached to pipe 24. Thus, while each satellite gear 34 is free to rotate about its associated rod 36, each satellite gear 34 remains in a fixed location relative to pipe 24. It is worth noting here that, in the configuration described, first ring gear 28 and second ring gear 32 rotate in opposite directions.

Alternatively, ring gears 28, 32 and satellite gears 34 could be replaced with disks and rollers, or a combination of ring gears, satellite gears, disks, and rollers could be used. For example, one satellite gear could be used in conjunction with two ring gears, wherein the ring gears have circular bearing surfaces on which a roller, positioned diametrically opposite the satellite gear, could roll. Many such combinations could be used (e.g., two satellite gears along with two rollers, all spaced ninety degrees apart).

As shown and as alluded to above, first turbine 12 is rotatably mounted on pipe 24, rearward of gearbox 20. First turbine 12 may be mounted using, for example, bearings 25. A first sleeve 38 of slightly larger diameter than pipe 24 extends from first turbine 12 into gearbox 20. As stated above, first sleeve 38 is attached to the rearward side of second ring gear 32. First sleeve 38 may have, for example, a flange (not shown) on one or both ends by which it is attached to the described adjoining structure (e.g., second ring gear 32 or first turbine 12). Alternatively, first sleeve 38 may be an integral part of one of the adjoining structures. For example, first sleeve 38 may be an integral extension of the bearing 25 on which first turbine 12 is mounted. Appropriate seals may be used to seal between pipe 24 and first sleeve 38 and between first sleeve 38 and gearbox housing 30.

Figure 2:
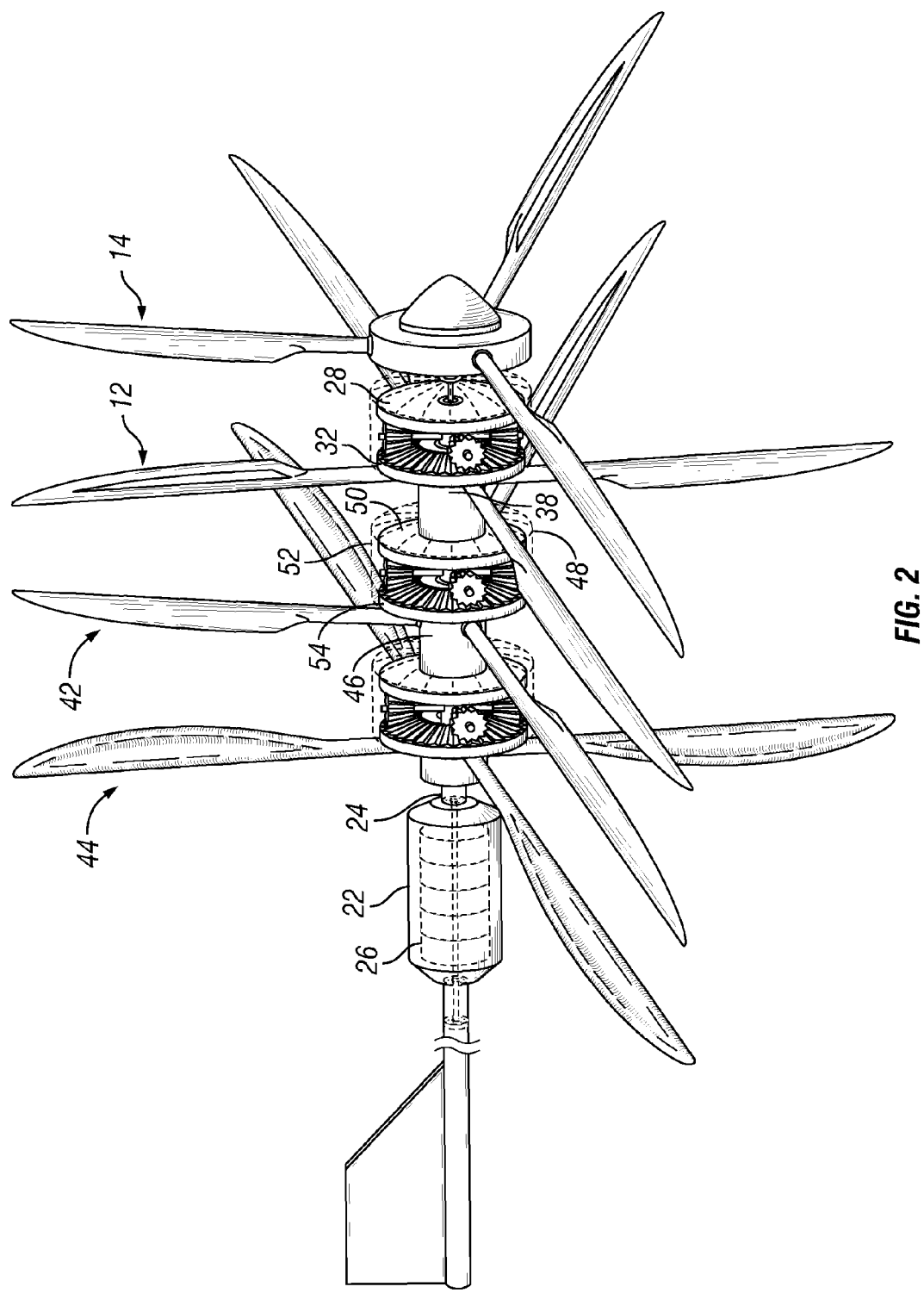
FIG. 2 is a schematic drawing of a wind generator that includes an alternative embodiment of a drive system constructed in accordance with the present invention.

Returning now to blades 16, either conventional blades, i.e., those known in the art, or non-conventional blades, as described herein, may be used. One example of a non-conventional blade is one having a much larger surface area than a conventional blade. It may also have a concave profile rather than a conventional "propeller-type" contour. (See blades 16 on turbine 44 in FIG. 2.) The non-conventional blade may be tapered to have variable width along its length. The primary design criteria for the non-conventional blade, as contemplated here, is to catch as much wind as is practicable, and to also influence the direction of the wind exiting the blade surface. The contour and widths of blades 16 may be optimized for torque power, rotational speed, or a combination of torque and speed. Blades 16 may also have heating elements 40, such as resistive wires, embedded in or otherwise mounted onto blades 16. Blades 16 of second turbine 14 are designed to catch wind and cause second turbine 14 to rotate in a particular direction. Blades 16 of first turbine 12 are designed to catch wind and cause first turbine 12 to rotate in the direction opposite to that of second turbine 14

In operation, wind generator 10 takes energy from the wind and converts it to electrical energy. As wind blows past blades 16 of second turbine 14, it causes second turbine 14 and shaft 18 to spin. When shaft 18 spins, it causes electricity to be generated by electrical generator 22, as is known in the art. The vast majority of the wind that blows past second turbine 14 does so without impinging on blades 16 of second turbine 14. Thus, a great deal of wind energy goes untapped, as is the case for prior art wind generators. However, using the present invention, the wind that either passes freely through second turbine 14 or is deflected rearward by blades 16 of second turbine 14 may be caught by blades 16 of first turbine 12. As stated above, the wind impinging on blades 16 of first turbine 12 causes first turbine 12, and thereby second ring gear 32, to rotate in the direction opposite to the rotation of second turbine 14. The oppositely directed rotation of first turbine 12 and second ring gear 32 cause satellite gears 34 to rotate in place, transferring the torque of second ring gear 32 to first ring gear 28. The rotation of satellite gears 34 cause first ring gear 28 to rotate in a direction opposite that of second ring gear 32. That is, first ring gear 28 is driven by first turbine 12 such that first ring gear 28 applies a cooperative torque (i.e., in the same direction as that applied by second turbine 14) on shaft 18, thereby increasing the net torque on shaft 18.

The use of multiple turbines to drive a common shaft can be extended to any number of turbines, though constraints may impose practical limits. For example, in the embodiment shown in FIG. 2, four turbines are shown: first turbine 12, second turbine 14, third turbine 42, and fourth turbine 44. First and second turbines 12, 14 are essentially as described above, along with the described gearing mechanism. However, first turbine 12 now has a second sleeve 46, disposed coaxially about pipe 24, that extends rearward toward third turbine 42. Similar to first sleeve 38, second sleeve 46 is of slightly larger diameter than pipe 24 and extends from first turbine 12 into a second gearbox 48. Second sleeve 46 is attached to the forward side of a third ring gear 50, which is disposed in second gearbox 48 and rotatably mounted to pipe 24. Second sleeve 46 may have, for example, a flange (not shown) on one or both ends by which it is attached to the described adjoining structure (e.g., third ring gear 50 or first turbine 12). Alternatively, second sleeve 46 may be an integral part of one of the adjoining structures. For example, second sleeve 46 may be an integral extension of the bearing 25 on which first turbine 12 is mounted. Appropriate seals may be used to seal between pipe 24 and second sleeve 46 and between second sleeve 46 and a second gearbox housing 52. A fourth ring gear 54 is disposed in second gearbox 48 and is rotatably mounted on pipe 24 using, for example, bearings 25. Fourth ring gear 54 is attached on its rearward side to third turbine 42, as described in more detail below.

Two or more satellite gears 56 (FIG. 3A) are disposed between and rotatably engage third ring gear 50 and fourth ring gear 54. Preferably two pairs of diametrically opposed satellite gears 56 are used (i.e., four gears spaced ninety degrees apart), but more or fewer satellite gears 56 may be used. Third ring gear 50, fourth ring gear 54, and satellite gears 56 are all preferably beveled in a complementary fashion, as is known in the art, so as to allow satellite gears 56 to simultaneously engage and rotate relative to third ring gear 50 and fourth ring gear 54. Each satellite gear 56 is rotatably mounted on one end of an associated rod 58. The other end of that associated rod 58 is attached to pipe 24. Thus, while each satellite gear 56 is free to rotate about its associated rod 58, each satellite gear 56 remains in a fixed location relative to pipe 24. In the configuration described, third ring gear 50 and fourth ring gear 54 rotate in opposite directions. Stated differently, second ring gear 32, first turbine 12, and third ring gear 50 all rotate in the same direction while fourth ring gear 54, third turbine 42, second turbine 14, and first ring gear 28 all rotate in the opposite direction. The turbines, by virtue of the gearing mechanisms, have their respective torques combined so as to drive shaft 18 in a desired direction. Blades 16 of each turbine are configured to drive their respective turbine in the appropriate direction.

One may choose to limit the number of turbines to three, and use the three-turbine embodiment described above, or one may incorporate fourth turbine 44 into the drive system. Fourth turbine 44 may be added into the drive mechanism in the same way that third turbine 42 was added. In the manner described above, a fifth ring gear would be attached to third turbine 42, and a sixth ring gear would be attached to fourth turbine 44. Satellite gears would transfer the torque from fourth turbine 44 to third turbine 42, whereby it would ultimately be transferred onto shaft 18. Any desired number of turbines could be added in this manner.

While the invention has been described in terms of generating electrical power using a wind generator, the drive system may be used in other applications. That is, multiple turbines may extract energy from a flowing fluid and work cooperatively through a gear train to rotate a shaft. The rotating shaft, or more precisely, the kinetic energy extracted from the flowing fluid, may be put to various uses beyond that of generating electrical power. For example, the drive system could power a pump to lift or move fluids. The drive system could be adapted for use in any conventional application of a windmill, though it is certainly not limited to those applications.

The drive system could also be adapted for use with flowing liquids, such as water. The blades would typically be shorter because of the difference in flow dynamics, but the fundamental idea of cooperative turbines is the same. In addition, the drive system could be used in oil and gas exploration or production. For example, the system could be used downhole to provide power (electrical or mechanical), for example, for logging tools (e.g., resistivity, nuclear, nuclear magnetic resonance, while-drilling tools, telemetry, sampling, etc.) or completion hardware (e.g., packers, safety valves, formation isolation valves, perforating guns, etc.). The above examples are illustrative only and the invention is not limited just to those. The fluid could be, for example, drilling fluid ("mud") or production/wellbore fluid.

Dimensions of the drive system may be optimized to minimize vibration of the drive shaft and to distribute external loading through the gear train. For example, the ring gear diameters could be chosen so as to distribute the dynamic pressure of the wind over a relatively large area, thereby reducing the pressure. One or more of the bearings used to secure the shaft may be a pressure bearing 27. Also, though "direct drive" systems have been described herein, the output shaft of the drive system could serve as an input to a conventional gearing system to control, for example, angular speed or torque.

Figure 5:
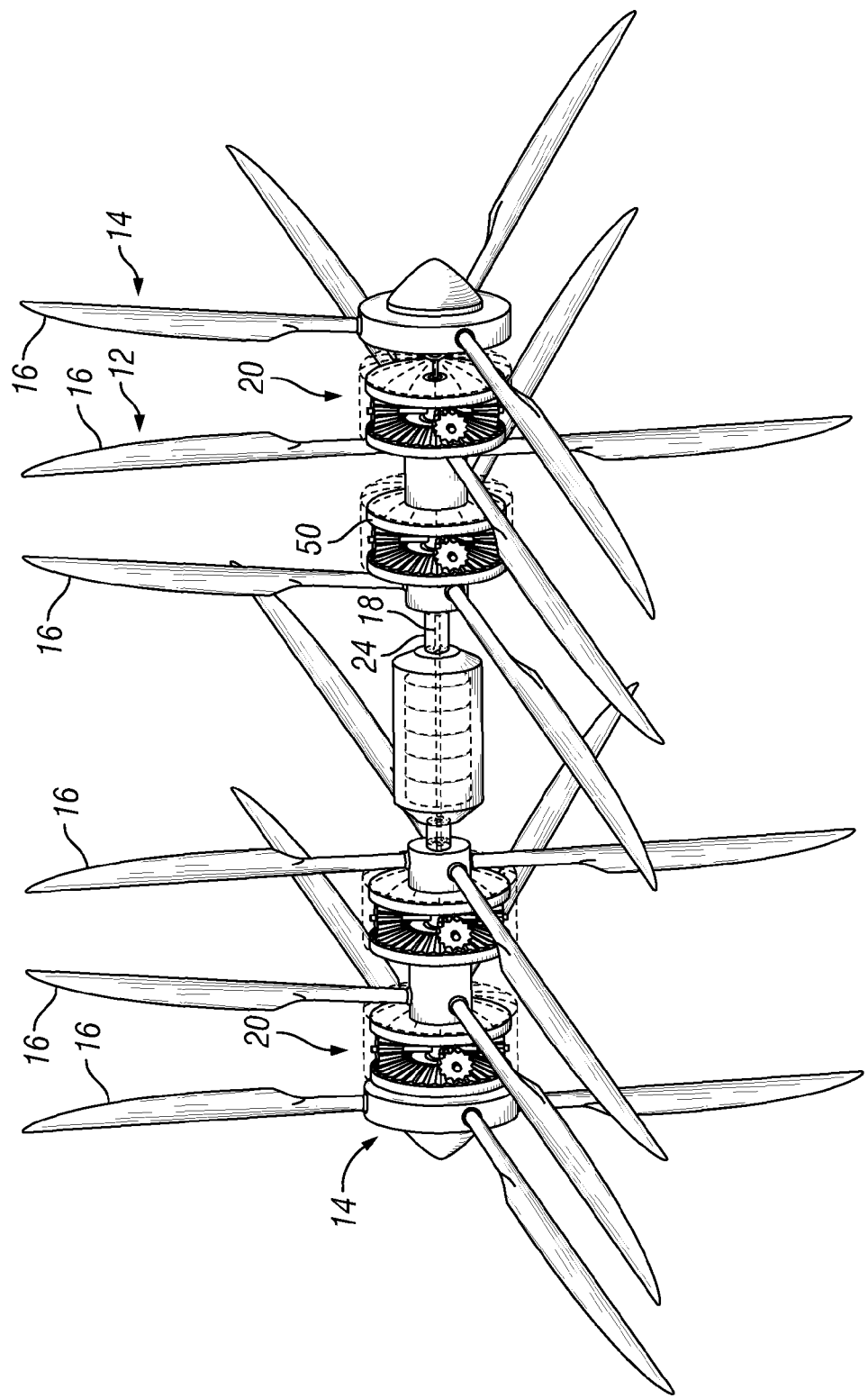
FIG. 5 is a schematic drawing of a wind generator that includes an alternative embodiment of a drive system constructed in accordance with the present invention.

Though the embodiments shown have the drive system offset to one side of a connecting apparatus (e.g., a generator), the invention is not limited to such configurations. For example, FIG. 5 shows that the rotating shaft could extend through the connecting apparatus and a drive system may be coupled to that portion (that is, the opposite end) of the shaft as well. Similarly, separate shafts and drive systems may be mounted on either side of the connecting apparatus, with each shaft coupling cooperatively to the connecting apparatus. In the case of a wind generator, such embodiments would preferably not have a tail section to control the orientation of the turbines relative to the wind direction. Instead, such orientation is preferably electronically controlled.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A drive system used with a flowing fluid, comprising:
a first gear connected directly or indirectly to a shaft;
a first turbine rotatably mounted on an exterior surface of a pipe;
a second gear rotatably mounted on the exterior surface of the pipe and joined to the first turbine, and
one or more satellite gears, each rotatably mounted on a non-drive shaft rod, in fixed locations relative to the pipe and rotatably engaged, directly or indirectly, with the first gear and the second gear.

2. The drive system of claim 1, further comprising a second turbine connected to the shaft and/or the first gear.

3. The drive system of claim 1, further comprising:
a third gear rotatably mounted on the pipe and connected to the first turbine;
a third turbine rotatably mounted on the pipe;
a fourth gear rotatably mounted on the pipe and connected to the third turbine, and
one or more satellite gears in fixed locations relative to the pipe and rotatably engaged, directly or indirectly, with the third gear and the fourth gear.

4. The drive system of claim 3, further comprising:
one or more additional turbines rotatably mounted on the pipe;
one or more pairs of additional gears rotatably mounted on the pipe, each pair of additional gears having one pair member connected to a rearward side of one of the turbines and the other pair member connected to a forward side of the most proximate rearwardly disposed turbine, and
one or more additional sets of one or more satellite gears in fixed locations relative to the pipe, each set being rotatably engaged, directly or indirectly, with one of the pairs of additional gears.

5. The drive system of claim 1, further comprising two or more blades joined to the first turbine.

6. The drive system of claim 5, wherein one or more of the blades has a concave profile.

7. The drive system of claim 5, further comprising a heating element embedded in or disposed on one or more of the blades.

8. The drive system of claim 1, wherein the shaft passes through an interior region of the pipe.

9. The drive system of claim 1, wherein the shaft is mounted in one or more bearings.

10. The drive system of claim 9, wherein at least one of the one or more bearings is a pressure bearing.

11. The drive system of claim 1, further comprising a gearbox housing at least partially enclosing the first gear, the second gear, and the satellite gears.

12. The drive system of claim 1, wherein each rod extends from the exterior surface of the pipe to the satellite gear.

13. A method to extract energy from a flowing fluid, comprising:
providing a drive system comprising, a first gear connected directly or indirectly to a shaft, a first turbine rotatably mounted on an exterior surface of a pipe, a second gear rotatably mounted on the exterior surface of the pipe and joined to the first turbine, and one or more satellite gears, each rotatably mounted on a non-drive shaft rod, in fixed locations relative to the pipe and rotatably engaged, directly or indirectly, with the first gear and the second gear; and
placing the drive system in the flowing fluid.

14. The method of claim 13 further comprising adding to the drive system a second turbine connected to the shaft and/or the first gear.

15. The method of claim 13, further comprising coupling the shaft to a device.

16. The method of claim 13, wherein the fluid is air or water.

17. The method of claim 13, further comprising:
adding to the drive system a third gear rotatably mounted on the pipe and connected to the first turbine, a third turbine rotatably mounted on the pipe, a fourth gear rotatably mounted on the pipe and connected to the third turbine, and one or more satellite gears in fixed locations relative to the pipe and rotatably engaged, directly or indirectly, with the third gear and the fourth gear.

18. The method of claim 17, further comprising:
adding to the drive system one or more additional turbines rotatably mounted on the pipe, one or more pairs of additional gears rotatably mounted on the pipe, each pair of additional gears having one pair member connected to a rearward side of one of the turbines and the other pair member connected to a forward side of the most proximate rearwardly disposed turbine, and one or more additional sets of one or more satellite gears in fixed locations relative to the pipe, each set being rotatably engaged, directly or indirectly, with one of the pairs of additional gears.

19. A wind generator, comprising:
a first gear connected directly or indirectly to a shaft;
a first turbine rotatably mounted on an exterior surface of a pipe;
a second gear rotatably mounted on the exterior surface of the pipe and joined to the first turbine;
one or more satellite gears, each rotatably mounted on a non-drive shaft rod, in fixed locations relative to the pipe and rotatably engaged, directly or indirectly, with the first gear and the second gear; and
a generator coupled to the shaft.

20. The wind generator of claim 19, further comprising a second turbine connected to the shaft and/or the first gear.

21. The wind generator of claim 19, further comprising a gearbox housing at least partially enclosing the first gear, the second gear, and the satellite gears.

22. The wind generator of claim 19, wherein each rod extends from the exterior surface of the pipe to the satellite gear.

23. The wind generator of claim 19, wherein the shaft passes through an interior region of the pipe.

24. A method to generate electrical energy, comprising:
providing a drive system comprising, a first gear connected directly or indirectly to a shaft, a first turbine rotatably mounted on an exterior surface of a pipe, a second gear rotatably mounted on the exterior surface of the pipe and joined to the first turbine, and one or more satellite gears, each rotatably mounted on a non-drive shaft rod, in fixed locations relative to the pipe and rotatably engaged, directly or indirectly, with the first gear and the second gear; and
coupling the shaft to a generator; and
allowing fluid to flow past the drive system.

25. The method of claim 24, further comprising adding to the drive system a second turbine connected to the shaft and/or the first gear.

26. The method of claim 24, wherein the fluid is air or water.

27. A drive system used with a flowing fluid to drive a connecting apparatus, comprising:
a first gear connected directly or indirectly to a shaft;
a first turbine rotatably mounted on a first pipe, the first pipe being located on one side of the connecting apparatus;
a second gear rotatably mounted on the first pipe and connected to the first turbine,
one or more satellite gears in fixed locations relative to the first pipe and rotatably engaged, directly or indirectly, with the first gear and the second gear;
a second turbine rotatably mounted on a second pipe, the second pipe being located on the opposite side of the connecting apparatus from the first pipe;
a third gear rotatably mounted on the second pipe and connected to the second turbine;
a fourth gear connected directly or indirectly to the shaft, and
one or more satellite gears in fixed locations relative to the second pipe and rotatably engaged, directly or indirectly, with the third gear and the fourth gear.

28. The drive system of claim 27, further comprising a third turbine connected to the shaft and/or the first gear.

29. The drive system of claim 27, further comprising a fourth turbine connected to the shaft and/or the fourth gear.

30. The drive system of claim 27, further comprising:
one or more additional turbines, each turbine rotatably mounted on one of the pipes and located successively closer to the connecting apparatus than the turbines already mounted on that pipe;
one or more pairs of additional gears, each pair of additional gears being rotatably mounted between adjacent turbines, and
one or more additional sets of one or more satellite gears in fixed locations relative to the first or second pipe, each set being rotatably engaged, directly or indirectly, with one of the pairs of additional gears.

31. A drive system used with a flowing fluid, comprising:
a first disk connected directly or indirectly to a shaft;
a first turbine rotatably mounted on a pipe;
a second disk rotatably mounted on the pipe and connected to the first turbine, and
one or more rollers in fixed locations relative to the pipe and rotatably engaged, directly or indirectly, with the first disk and the second disk.

32. The drive system of claim 31, further comprising one or more satellite gears in fixed locations relative to the pipe, each satellite gear being rotatably engaged, directly or indirectly, with gear teeth on the first and second disks.

* * * * *